United States Patent
Kim et al.

(10) Patent No.: US 9,854,625 B2
(45) Date of Patent: Dec. 26, 2017

(54) METHOD AND APPARATUS FOR TRANSMITTING SIGNAL BY NAN TERMINAL IN WIRELESS COMMUNICATION SYSTEM

(71) Applicant: LG ELECTRONICS INC., Seoul (KR)

(72) Inventors: Dongcheol Kim, Seoul (KR); Suhwook Kim, Seoul (KR); Hangyu Cho, Seoul (KR); Byungjoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 90 days.

(21) Appl. No.: 15/025,011

(22) PCT Filed: Oct. 22, 2014

(86) PCT No.: PCT/KR2014/009974
§ 371 (c)(1),
(2) Date: Mar. 25, 2016

(87) PCT Pub. No.: WO2015/060651
PCT Pub. Date: Apr. 30, 2015

(65) Prior Publication Data
US 2016/0249409 A1    Aug. 25, 2016

Related U.S. Application Data

(60) Provisional application No. 61/893,899, filed on Oct. 22, 2013.

(51) Int. Cl.
*H04W 76/06* (2009.01)
*H04W 74/08* (2009.01)
(Continued)

(52) U.S. Cl.
CPC .......... *H04W 76/066* (2013.01); *H04L 45/20* (2013.01); *H04W 56/0015* (2013.01); *H04W 74/0808* (2013.01); *H04W 84/12* (2013.01)

(58) Field of Classification Search
CPC .. H04W 74/0808; H04L 84/12; H04L 76/066; H04L 56/0015
See application file for complete search history.

(56) References Cited

U.S. PATENT DOCUMENTS

| | | |
|---|---|---|
| 2013/0235720 A1 | 9/2013 | Wang et al. |
| 2014/0301190 A1* | 10/2014 | Abraham ............ H04W 28/044 370/230 |

FOREIGN PATENT DOCUMENTS

| | | |
|---|---|---|
| KR | 10-2005-0070985 A | 7/2005 |
| WO | 2013/036092 A2 | 3/2013 |

(Continued)

*Primary Examiner* — Jianye Wu
(74) *Attorney, Agent, or Firm* — Dentons US LLP

(57) ABSTRACT

A method for transmitting a signal by a neighbor awareness networking (NAN) terminal in a wireless communication system, according to embodiment of the present invention, comprises the steps of: sensing a medium in a discovery window; selecting a back-off count value when the medium is in an occupied state; and transmitting a service discovery frame after performing countdown on the basis of the back-off count value, wherein an interval in which the back-off count value is determined on the basis of at least one of an interval in which a back-off count value for transmitting a synchronization beacon frame is selected, the length of the discovery window, and a hop count value of the terminal.

13 Claims, 7 Drawing Sheets

(51) Int. Cl.
*H04L 12/733* (2013.01)
*H04W 56/00* (2009.01)
*H04W 84/12* (2009.01)

(56) References Cited

FOREIGN PATENT DOCUMENTS

| WO | 2013/081393 A1 | 6/2013 |
|---|---|---|
| WO | 2013/141672 A1 | 9/2013 |

* cited by examiner

METHOD AND APPARATUS FOR TRANSMITTING SIGNAL BY NAN TERMINAL IN WIRELESS COMMUNICATION SYSTEM

This application is a National Stage Entry of International Application No. PCT/KR2014/009974 filed Oct. 22, 2014, which claims benefit of and priority to U.S. Provisional Application No. 61/893,899 filed Oct. 22, 2013, each of which are incorporated by reference for all purposes as if fully set forth herein.

TECHNICAL FIELD

The present invention relates to a wireless communication system, and more particularly, to a method for a neighbor awareness networking (NAN) terminal to transmit a signal and apparatus therefor.

BACKGROUND ART

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable terminal such as a personal digital assistant (PDA), a laptop computer, a portable multimedia player (PMP), etc. based on a radio frequency technology.

DISCLOSURE OF THE INVENTION

Technical Task

The technical task of the present invention is to enable a neighbor awareness networking (NAN) terminal to select a suitable back-off count value when the NAN terminal transmits a synchronization beacon frame and a service discovery frame.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a $1^{st}$ technical aspect of the present invention, provided herein is a method of transmitting a signal by a NAN (neighbor awareness networking) terminal in a wireless communication system, including the steps of sensing a medium within a discovery window, selecting a back-off count value when the medium is in an occupied state, and transmitting a service discovery frame after performing countdown based on the back-off count value, wherein an interval for selecting the back-off count value is determined based on at least one selected from the group consisting of an interval for selecting a back-off count value for transmission of a synchronization beacon frame, a length of the discovery window, and a value of a hop count of the terminal.

In a $2^{nd}$ technical aspect of the present invention, provided herein is A NAN (neighbor awareness networking) terminal in a wireless communication system, including a receiving module and a processor, wherein the processor is configured to sense a medium within a discovery window, to select a back-off count value when the medium is in an occupied state, and to transmit a service discovery frame after performing countdown based on the back-off count value and wherein an interval for selecting the back-off count value is determined based on at least one selected from the group consisting of an interval for selecting a back-off count value for transmission of a synchronization beacon frame, a length of the discovery window, and a value of a hop count of the terminal.

At least one of the following matters may be included in the $1^{st}$ and $2^{nd}$ technical aspects of the present invention.

When the hop count is 0, a minimum value of the interval for selecting the back-off count value may be equal to or greater than a maximum value of the interval for selecting the back-off count value for the synchronization beacon frame transmission.

When the hop count is 0, a minimum value of the interval for selecting the back-off count value may be greater than a value obtained by subtracting a slot size corresponding to a length of the synchronization beacon frame from a maximum value of the interval for selecting the back-off count value for the synchronization beacon frame transmission.

When the hop count is 1, a minimum value of the interval for selecting the back-off count value may be equal to or greater than a minimum value of the interval for selecting the back-off count value for the synchronization beacon frame transmission.

As the length of the discovery window increases, a minimum value of the interval for selecting the back-off count value may increase.

A maximum value of the interval for selecting the back-off count value may be set to 500.

When the hop count corresponds to a largest value in available values, a minimum value of the interval for selecting the back-off count value may be greater than a maximum value of the interval for selecting the back-off count value for the synchronization beacon frame transmission.

The terminal may correspond to a terminal serving as a master in a NAN cluster.

When the medium is in the occupied state, the countdown is stopped.

The terminal may select a random factor before the discovery window starts.

The terminal may select a random factor immediately before transmitting the synchronization beacon frame.

When a master rank determined based on the selected random factor is greater than a stored anchor master rank, the terminal serves as an anchor master.

Advantageous Effects

According to the present invention, a back-off count value for a synchronization beacon frame can be prevented from being set larger than a back-off count value for a service discovery frame. In other words, the synchronization beacon frame can be configured to be transmitted in advance of the service discovery frame and thus it can prevent NAN devices from operating at wrong times due to failure in receiving at least one synchronization beacon. More particularly, in both of the synchronization beacon frame and the service discovery frame, a frame transmission opportunity is given by the back-off count value through a contention mode. In this case, if the back-off count value for the synchronization beacon frame is set to be larger than the back-off count value for the service discovery frame, there may occur a case that the synchronization beacon frame is not transmitted.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 8 is a diagram illustrating a discovery window and the like.

BEST MODE FOR INVENTION

Figure 1:
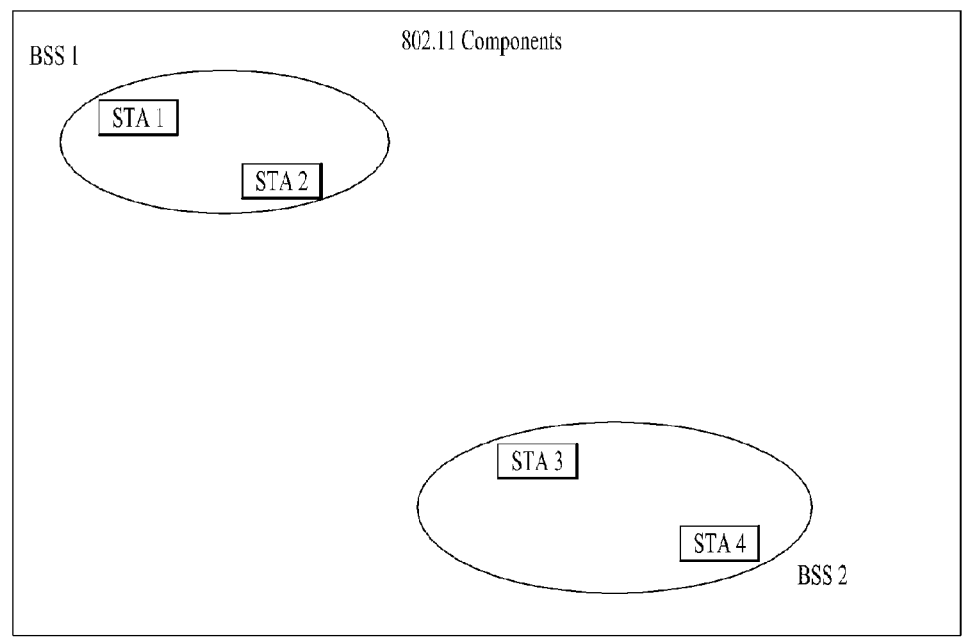
FIG. 1 is a diagram illustrating an exemplary structure of IEEE 802.11 system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. For clarity, the following description focuses on IEEE 802.11 systems. However, technical features of the present invention are not limited thereto.

Structure of WLAN System

FIG. 1 is a diagram illustrating an exemplary structure of IEEE 802.11 system to which the present invention is applicable.

IEEE 802.11 structure may include a plurality of components and WLAN supportive of transparent STA mobility for an upper layer can be provided by interactions between the components. A basic service set (BSS) may correspond to a basic component block in IEEE 802.11 WLAN. FIG. 1 shows one example that two basic service sets BSS 1 and BSS 2 exist and that 2 STAs are included as members of each BSS. In particular, STA 1 and STA 2 are included in the BSS 1 and STA 3 and STA 4 are included in the BSS 2. In FIG. 1, an oval indicating the BSS can be understood as indicating a coverage area in which the STAs included in the corresponding BSS maintain communication. This area may be called a basic service area (BSA). Once the STA moves out of the BSA, it is unable to directly communicate with other STAs within the corresponding BSA.

A most basic type of BSS in IEEE 802.11 WLAN is an independent BSS (IBSS). For instance, IBSS can have a minimum configuration including 2 STAs only. Moreover, the BSS (e.g., BSS 1 or BSS 2) shown in FIG. 1, which has the simplest configuration and in which other components are omitted, may correspond to a representative example of the IBSS. Such a configuration is possible if STAs can directly communicate with each other. Moreover, the above-mentioned WLAN is not configured according to a devised plan but can be configured under the necessity of WLAN. And, this may be called an ad-hoc network.

If an STA is turned on/off or enters/escapes from a BSS area, membership of the STA in a BSS can be dynamically changed. In order to obtain the membership of the BSS, the STA can join the BSS using a synchronization procedure. In order to access all services of the BSS based structure, the STA should be associated with the BSS. This association may be dynamically configured or may include a use of a DSS (distribution system service).

Additionally, FIG. 1 shows components such as a DS (distribution system), a DSM (distribution system medium), an AP (access point) and the like.

In WLAN, a direct station-to-station distance can be restricted by PHY capability. In some cases, the restriction of the distance may be sufficient enough. However, in some cases, communication between stations located far away from each other may be necessary. In order to support extended coverage, the DS (distribution system) may be configured.

The DS means a structure in which BSSs are interconnected with each other. Specifically, the BSS may exist as an extended type of component of a network consisting of a plurality of BSSs instead of an independently existing entity as shown in FIG. 1.

The DS corresponds to a logical concept and can be specified by a characteristic of the DSM. Regarding this, IEEE 802.11 standard logically distinguishes a wireless medium (WM) from the DSM. Each of the logical media is used for a different purpose and is used as a different component. According to the definition of the IEEE 802.11 standard, the media are not limited to be identical to each other or to be different from each other. Since a plurality of the media are logically different from each other, flexibility of IEEE 802.11 WLAN structure (a DS structure or a different network structure) can be explained. In particular, the IEEE 802.11 WLAN structure can be implemented in various ways and the WLAN structure can be independently specified by a physical characteristic of each implementation case.

The DS can support a mobile device in a manner of providing seamless integration of a plurality of BSSs and logical services necessary for handling an address to a destination.

The AP enables associated STAs to access the DS through the WM and corresponds to an entity having STA functionality. Data can be transferred between the BSS and the DS through the AP. For instance, as shown in FIG. 1, while each of the STA 2 and STA 3 have STA functionality, the STA 2 and STA 3 provide functions of enabling associated STAs (STA 1 and STA 4) to access the DS. And, since all APs basically correspond to an STA, all APs correspond to an addressable entity. An address used by the AP for communication in the WM should not be identical to an address used by the AP for communication in the DSM.

Data transmitted from one of STAs associated with an AP to an STA address of the AP is always received in an uncontrolled port and the data can be processed by an IEEE 802.1X port access entity. Moreover, if a controlled port is authenticated, transmission data (or frame) can be delivered to a DS.

Layer Structure

Operations of the STA which operates in a wireless LAN system can be explained in terms of the layer structure. In terms of a device configuration, the layer structure can be implemented by a processor. The STA may have a structure of a plurality of layers. For example, a main layer structure handled in the 802.11 standard document includes a MAC sublayer and a physical (PHY) layer on a data link layer (DLL). The PHY layer may include a physical layer convergence procedure (PLCP) entity, a physical medium dependent (PMD) entity, etc. The MAC sublayer and the PHY layer conceptually include management entities called MAC sublayer management entity (MLME) and physical layer management entity (PLME), respectively. These entities provide a layer management service interface for performing a layer management function.

A station management entity (SME) is present within each STA in order to provide an accurate MAC operation. The SME is a layer-independent entity that may be considered as existing in a separate management plane or as being off to the side. Detailed functions of the SME are not specified in this document but it may be generally considered as being responsible for functions of gathering layer-dependent status from the various layer management entities (LMEs), setting values of layer-specific parameters similar to each other. The SME may perform such functions on behalf of general system management entities and may implement a standard management protocol.

The aforementioned entities interact with each other in various ways. For example, the entities may interact with each other by exchanging GET/SET primitives. The primitive means a set of elements or parameters related to a specific purpose. XX-GET.request primitive is used for requesting a value of a given MIB attribute (management information based attribute). XX-GET.confirm primitive is used for returning an appropriate MIB attribute value if a status is 'success', otherwise it is used for returning an error indication in a status field. XX-SET.request primitive is used to request that an indicated MIB attribute be set to a given value. If this MIB attribute implies a specific action, this requests that the action be performed. And, XX-SET.confirm primitive is used such that, if the status is 'success', this confirms that the indicated MIB attribute has been set to the requested value, otherwise it is used to return an error condition in the status field. If this MIB attribute implies a specific action, this confirms that the action has been performed.

Moreover, the MLME and the SME may exchange various MLME_GET/SET primitives through an MLME SAP (service access point). Furthermore, various PLME_GET/SET primitives may be exchanged between the PLME and the SME through PLME_SAP and may be exchanged between the MLME and the PLME through an MLME-PLME_SAP.

NAN (Neighbor Awareness Network) Topology

Figure 2:
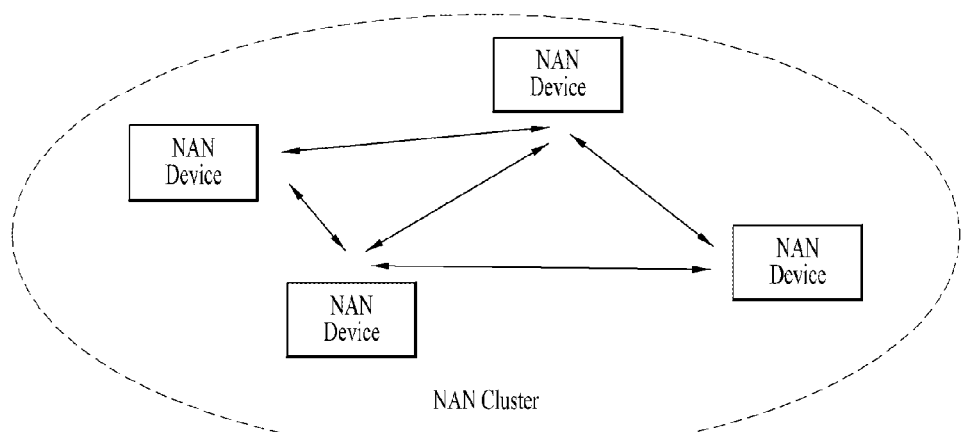
FIGS. 2 and 3 are diagrams illustrating examples of a NAN cluster.
Figure 3:
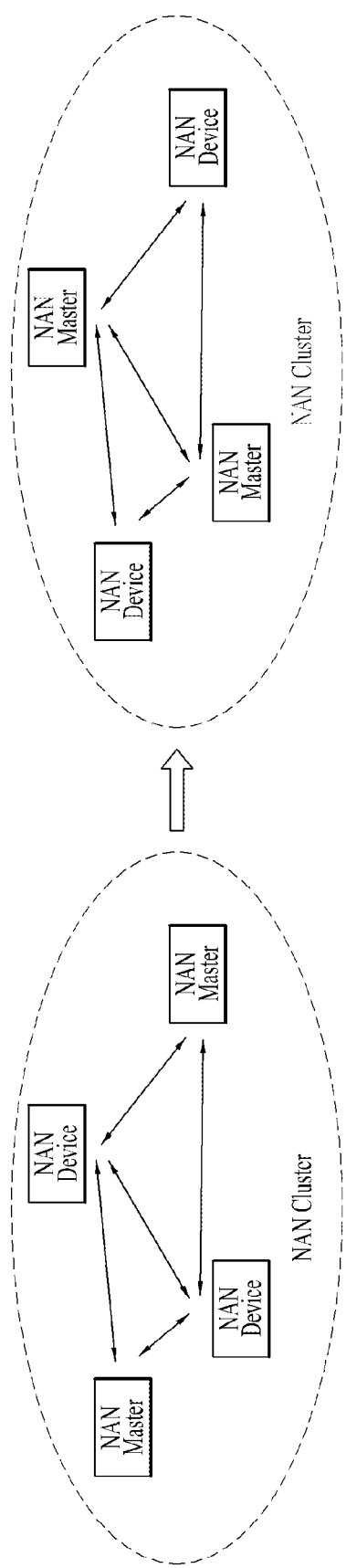

A NAN network can be constructed with NAN devices (terminals) that use a set of identical NAN parameters (e.g., a time interval between consecutive discovery windows, an interval of a discovery window, a beacon interval, a NAN channel, etc.). A NAN cluster can be formed by NAN terminals and the NAN cluster means a set of NAN terminals that are synchronized on the same discovery window schedule. And, a set of the same NAN parameters is used in the NAN cluster. FIG. 2 illustrates an example of the NAN cluster. A NAN terminal included in the NAN cluster may directly transmit a multicast/unicast service discovery frame to a different NAN terminal within a range of the discovery window. As shown in FIG. 3, at least one NAN master may exist in a NAN cluster and the NAN master may be changed. Moreover, the NAN master may transmit all of a synchronization beacon frame, discovery beacon frame and service discovery frame.

NAN Device Architecture

Figure 4:
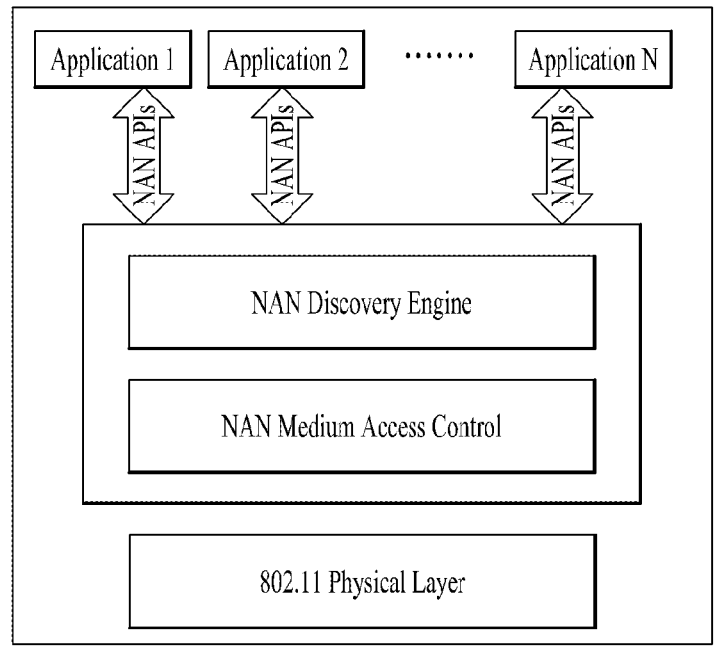
FIG. 4 illustrates an example of a structure of a NAN device (terminal).

FIG. 4 illustrates an example of a structure of a NAN device (terminal). Referring to FIG. 4, the NAN terminal is based on a physical layer in 802.11 and its main components correspond to a NAN discovery engine, a NAN MAC (medium access control), and NAN APIs connected to respective applications (e.g., Application 1, Application 2, . . . , Application N).

Figure 5:
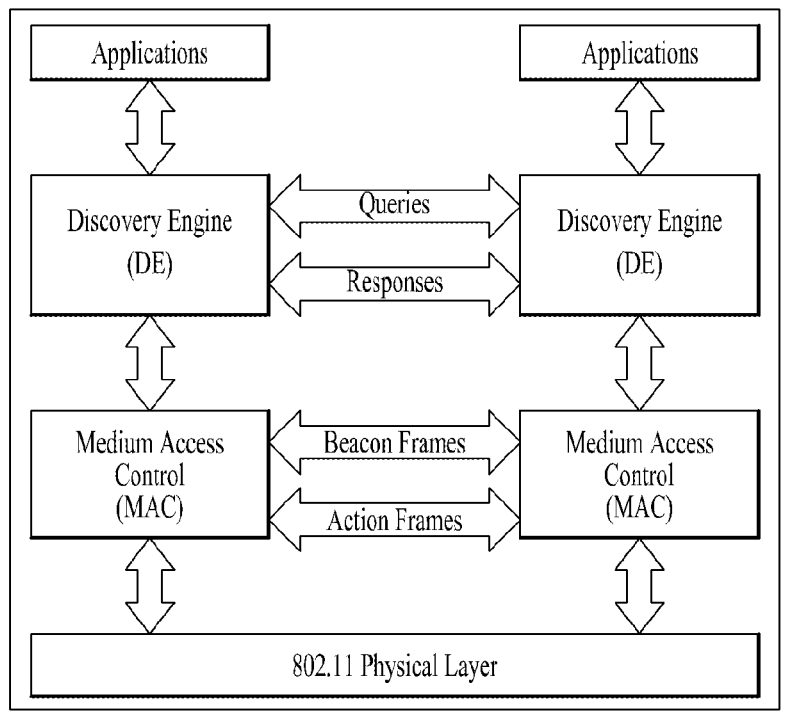
FIGS. 5 and 6 illustrate relations between NAN components.
Figure 6:
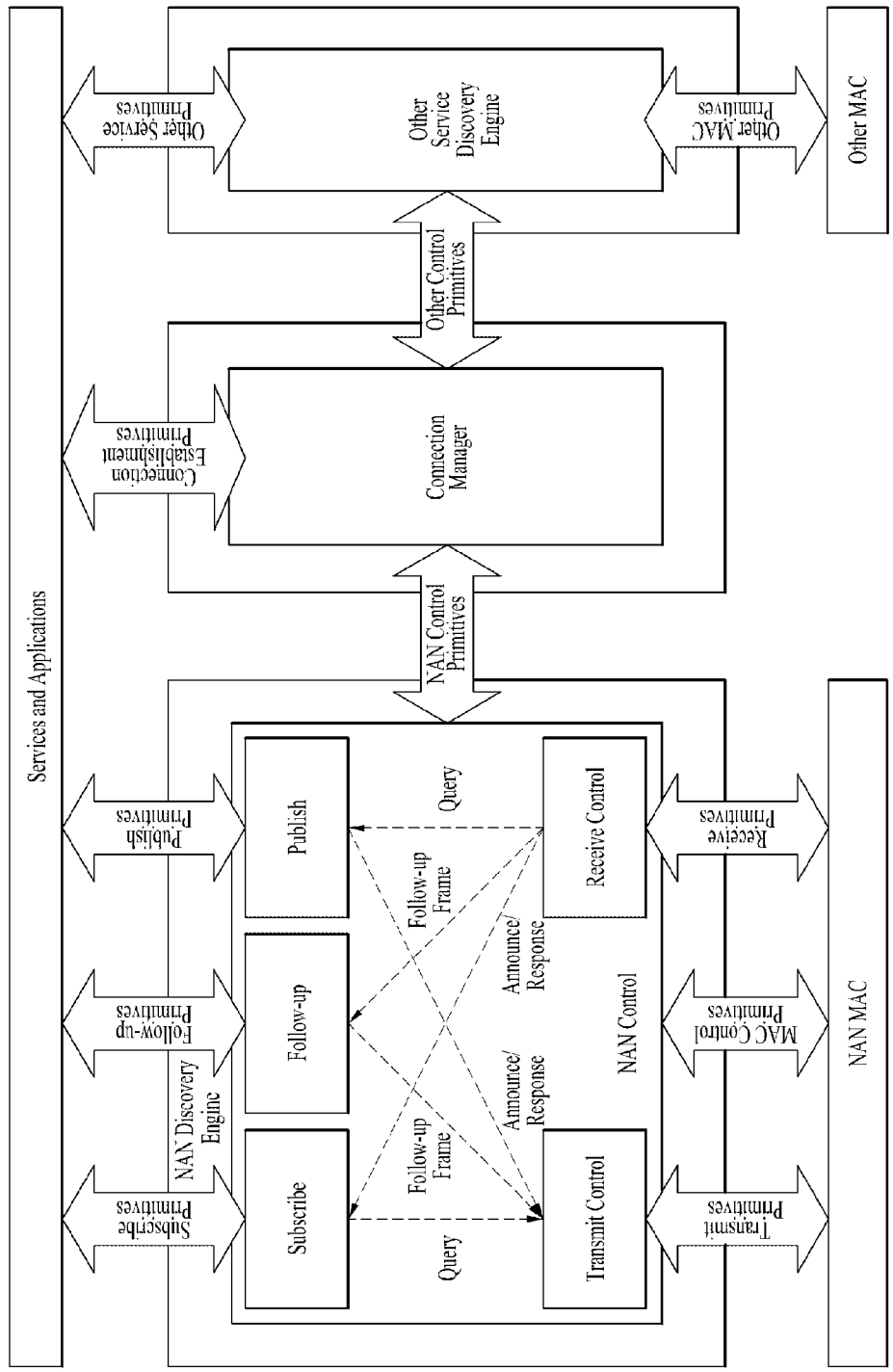

FIGS. 5 and 6 illustrate relations between NAN components. Service requests and responses are processed through the NAN discovery engine, and the NAN beacon frames and the service discovery frames are processed by the NAN MAC. The NAN discovery engine may provide functions of subscribing, publishing, and following-up. The publish/subscribe functions are operated by services/applications through a service interface. If the publish/subscribe commands are executed, instances for the publish/subscribe functions are generated. Each of the instances is driven independently and a plurality of instances can be driven simultaneously in accordance with the implementation. The follow-up function corresponds to means for the services/applications that transceive specific service information.

Role and State of NAN Device

Figure 7:
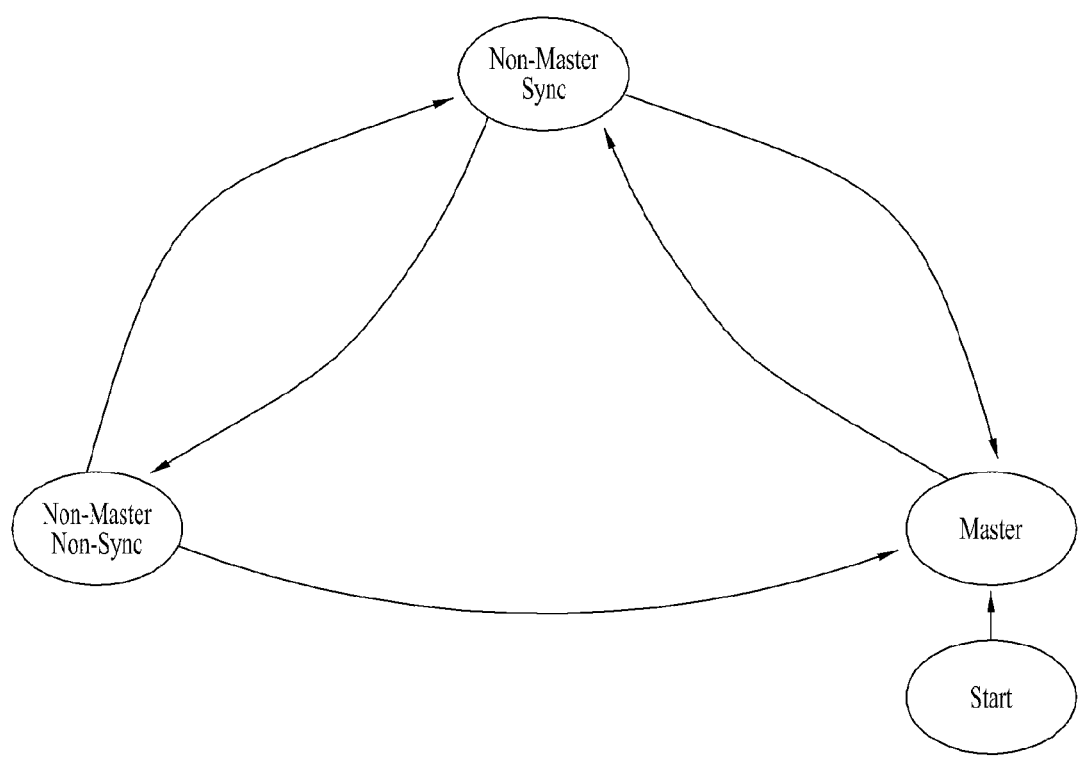
FIG. 7 is a diagram illustrating a state transition of a NAN device (terminal).

As mentioned in the foregoing description, a NAN device (terminal) can serve as a NAN master and the NAN master can be changed. In other words, roles and states of the NAN terminal can be shifted in various ways and related examples are illustrated in FIG. 7. The roles and states, which the NAN terminal can have, may include a master (hereinafter, the master means a state of master role and sync), a Non-master sync, and a Non-master Non-sync. Transmission availability of the discovery beacon frame and/or the synchronization beacon frame can be determined according to each of the roles and states and it may be set as illustrated in Table 1.

TABLE 1

| Role and State | Discovery Beacon | Synchronization Beacon |
| --- | --- | --- |
| Master | Transmission Possible | Transmission Possible |
| Non-Master Sync | Transmission Impossible | Transmission Possible |
| Non-Master Non-Sync | Transmission Impossible | Transmission Impossible |

The state of the NAN terminal can be determined according to a master rank (MR). The master rank indicates the preference of the NAN terminal to serve as the NAN master. In particular, a high master rank means strong preference for the NAN master. The NAN MR can be determined by Master Preference, Random Factor, Device MAC address, and the like according to Formula 1.

$$MasterRank = MasterPreference * 2^{56} + RandomFactor * 2^{48} + MAC[5] * 2^{40} + \ldots + MAC[0]$$

In Formula 1, the Master Preference, Random Factor, Device MAC address may be indicated through a master indication attribute. The master indication attributes may be set as illustrated in Table 2.

TABLE 2

| Field Name | Size (Octets) | Value | Description |
| --- | --- | --- | --- |
| Attribute ID | 1 | 0x00 | Identifies the type of NAN attribute. |
| Length | 2 | 2 | Length of the following field in the attribute |
| Master Preference | 1 | 0-255 | Information that is used to indicate a NAN Device's preference to serve as the role of Master, with a larger value indicating a higher preference. |
| Random Factor | 1 | 0-255 | A random number selected by the sending NAN Device. |

Regarding the above MR, in case of a NAN terminal that activates a NAN service and initiates a NAN cluster, each of the Master Preference and the Random Factor is set to 0 and NANWarmUp is reset. The NAN terminal should set a Master Preference field value in the master indication attribute to a value greater than 0 and a Random Factor value in the master indication attribute to a new value until when the NANWarmUp expires. When a NAN terminal joins a NAN cluster in which the Master Preference of an anchor master is set to a value greater than 0, the corresponding NAN terminal may set the Master Preference to a value greater than 0 and the Random Factor to a new value irrespective of expiration of the NANWarmUp.

Moreover, a NAN terminal can become an anchor master of a NAN cluster depending on an MR value. That is, all NAN terminals have capabilities of operating as the anchor master. The anchor master means the device that has a highest MR and a smallest AMBTT (anchor master beacon transmit time) value and has a hop count (HC) (to the anchor master) set to 0 in the NAN cluster. In the NAN cluster, two anchor masters may exist temporarily but a single anchor master is a principle of the NAN cluster. If a NAN terminal becomes an anchor master of a currently existing NAN cluster, the NAN terminal adopts TSF used in the currently existing NAN cluster without any change.

The NAN terminal can become the anchor master in the following cases: if a new NAN cluster is initiated; if the master rank is changed (e.g., if an MR value of a different NAN terminal is changed or if an MR value of the anchor master is changed); or if a beacon frame of the current anchor master is not received any more. In addition, if the MR value of the different NAN terminal is changed or if the MR value of the anchor master is changed, the NAN terminal may lose the status of the anchor master. The anchor master can be determined according to an anchor master selection algorithm in the following description. In particular, the anchor master selection algorithm is the algorithm for determining which NAN terminal becomes the anchor master of the NAN cluster. And, when each NAN terminal joins the NAN cluster, the anchor master selection algorithm is driven.

If a NAN terminal initiates a new NAN cluster, the NAN terminal becomes the anchor master of the new NAN cluster. If a NAN synchronization beacon frame has a hop count in excess of a threshold, the NAN synchronization beacon frame is not used by NAN terminals. And, other NAN synchronization beacon frames except the above-mentioned NAN synchronization beacon frame are used to determine the anchor master of the new NAN cluster.

If receiving the NAN synchronization beacon frame having the hop count equal to or less than the threshold, the NAN terminal compares an anchor master rank value in the beacon frame with a stored anchor master rank value. If the stored anchor master rank value is greater than the anchor master value in the beacon frame, the NAN terminal discards the anchor master value in the beacon frame. If the stored anchor master value is less than the anchor master value in the beacon frame, the NAN terminal newly stores values greater by 1 than the anchor master rank and the hop count included in the beacon frame and an AMBTT value in the beacon frame. If the stored anchor master rank value is equal to the anchor master value in the beacon frame, the NAN terminal compares hop counters. Then, if a hop count value in the beacon frame is greater than a stored value, the NAN terminal discards the received beacon frame. If the hop count value in the beacon frame is equal to (the stored value−1) and if an AMBTT value is greater than the stored value, the NAN terminal newly stores the AMBTT value in the beacon frame. If the hop count value in the beacon frame is less than (the stored value−1), the NAN terminal increases the hop count value in the beacon frame by 1. The stored AMBTT value is updated according to the following rules. If the received beacon frame is transmitted by the anchor master, the AMBTT value is set to the lowest four octets of time stamp included in the received beacon frame. If the received beacon frame is transmitted from a NAN master or non-master sync device, the AMBTT value is set to a value included in a NAN cluster attribute in the received beacon frame.

Meanwhile, a TSF timer of a NAN terminal exceeds the stored AMBTT value by more than 16*512 TUs (e.g., 16 DW periods), the NAN terminal may assume itself as an anchor master and then update an anchor master record. In addition, if any of MR related components (e.g., Master Preference, Random Factor, MAC Address, etc.) is changed, a NAN terminal not corresponding to the anchor master compares the changed MR with a stored value. If the changed MR of the NAN terminal is greater than the stored value, the corresponding NAN terminal may assume itself as the anchor master and then update the anchor master record.

Moreover, a NAN terminal may set anchor master fields of the cluster attributes in the NAN synchronization and discovery beacon frames to values in the anchor master record, except that the anchor master sets the AMBTT value to a TSF value of corresponding beacon transmission. The NAN terminal, which transmits the NAN synchronization beacon frame or the discovery beacon frame, may be confirmed that the TSF in the beacon frame is derived from the same anchor master included in the cluster attribute.

Moreover, a NAN terminal may adopt a TSF timer value in a NAN beacon received with the same cluster ID in the following case: i) if the NAN beacon indicates an anchor master rank higher than a value in an anchor master record of the NAN terminal; or ii) if the NAN beacon indicates an anchor master rank equal to the value in the anchor master record of the NAN terminal and if a hop count value and an AMBTT value in the NAN beacon frame are larger values in the anchor master record.

NAN Synchronization

NAN terminals (devices) participating in the same NAN Cluster may be synchronized with respect to a common clock. A TSF in the NAN cluster can be implemented through a distributed algorithm that should be performed by all the NAN terminals. Each of the NAN terminals participating in the NAN cluster may transmit NAN synchronization beacon frame (NAN sync beacon frame) according to the above-described algorithm. The NAN device may synchronize its clock during a discovery window (DW). A length of the DW corresponds to 16 TUs. During the DW, one or more NAN terminals may transmit synchronization beacon frames in order to help all NAN terminals in the NAN cluster synchronize their own clocks.

NAN beacon transmission is distributed. A NAN beacon frame is transmitted during a DW period existing at every 512 TU. All NAN terminals can participate in generation and transmission of the NAN beacon according to their roles and states. Each of the NAN terminals should maintain its own TSF timer used for NAN beacon period timing. A NAN synchronization beacon interval can be established by the NAN terminal that generates the NAN cluster. A series of TBTTs are defined so that the DW periods in which synchronization beacon frames can be transmitted are assigned exactly 512 TUs apart. Time zero is defined as a first TBTT and the discovery window starts at each TBTT.

Figure 8:
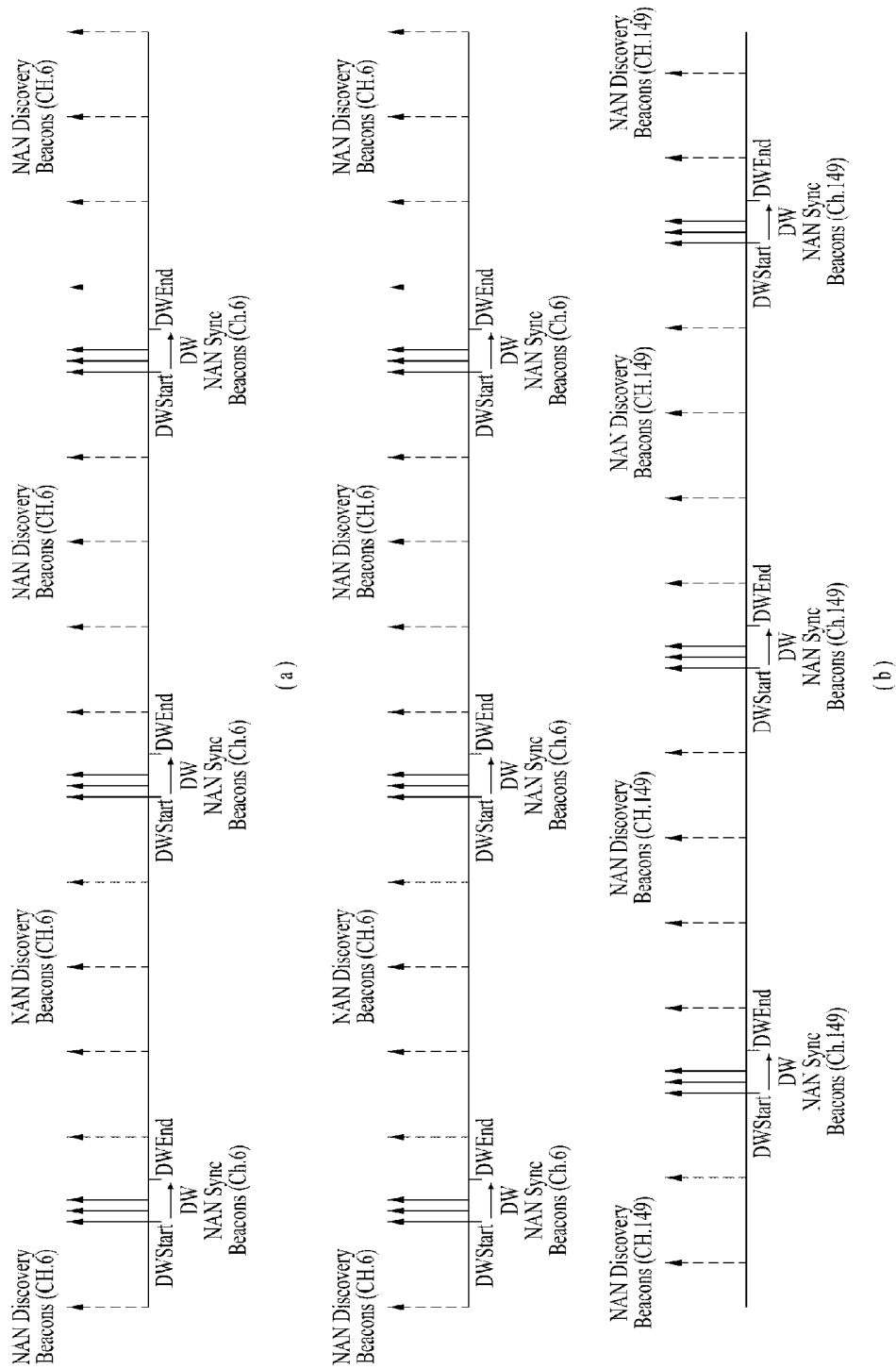

Each NAN terminal serving as a NAN master transmits a NAN discovery beacon frame from out of a NAN discovery window. On average, the NAN terminal serving as the NAN master transmits the NAN discovery beacon frame every 100 TUs. A time interval between consecutive NAN discovery beacon frames is smaller than 200 TUs. If a scheduled transmission time overlaps with a NAN discovery window of the NAN cluster in which the corresponding NAN terminal participates, the NAN terminal serving as the NAN master is able to omit transmission of the NAN discovery beacon frame. In order to minimize power required to transmit the NAN discovery beacon frame, the NAN terminal serving as the NAN master may use AC_VO (WMM Access Category—Voice) contention setting. FIG. 8 illustrates relations between a discovery window and a NAN discovery beacon frame and transmission of NAN synchronization/discovery beacon frames. Particularly, FIG. 8 (*a*) shows transmission of NAN discovery and synchronization beacon frames of a NAN terminal operating in 2.4 GHz band. FIG. 8 (*b*) shows transmission of NAN discovery and synchronization beacon frames of a NAN terminal operating in 2.4 GHz and 5 GHz bands.

In the following description, a method for mitigating contention in a discovery window according to an embodiment of the present invention is explained. A NAN is based on the existing back-off procedure defined in 802.11. In order to transmit a service discovery frame and/or a synchronization beacon frame, a NAN terminal senses a medium in a discovery window and then selects a back-off count value if the medium is in an occupied state. After performing countdown based on the selected back-off count value, the NAN terminal is able to transmit the service discovery frame and/or the synchronization beacon frame. In this case, a first back-off count value (c_dw) for service discovery frame transmission may be selected in an interval of [0, CW] in a random manner. If a hop count (HC) value is 0, a first back-off count value for synchronization beacon frame transmission is selected in an interval of [0, CW_RS]. If the hop count value is greater than 0, the first back-off count value may be selected in an interval of [HC*40, (HC+1)*40].

However, in case that the service discovery frame is transmitted, if the first back-off count value is determined as mentioned above, a NAN terminal with a large hop count can transmit the service discovery frame before transmitting the synchronization beacon frame. For instance, if a hop count is 10, an interval for selecting the first back-off count value related to the synchronization beacon frame corresponds to [400, 440] and an interval for selecting the first back-off count value related to the service discovery frame corresponds to [0, 500]. In this case, a selected first back-off count value related to the service discovery frame is highly likely to be smaller than that related to the synchronization beacon frame. In other words, the service discovery frame is highly likely to be transmitted before the synchronization beacon frame.

To prevent that the service discovery frame is transmitted before the synchronization beacon frame, an interval for selecting the (first) back-off count value for service discovery frame transmission can be determined based on at least one of an interval for selecting the back-off count value for synchronization beacon frame transmission, a length of the discovery window, and a hop count value of the NAN terminal. In particular, the interval in which the (first) back-off value for the service discovery frame is defined as [GuardNumber, CW] and GuardNumber, i.e., a minimum value for selecting the back-off count value can be defined as follows. (In this case, CW, i.e., a maximum value for selecting the back-off count value may be set to 500.)

If the hop count is 0, GuardNumber may be set equal to or greater than a maximum value (i.e., CW_RS) of the interval in which the back-off count value for the synchronization beacon frame transmission is selected (i.e., CW_RS<GuardNumber or CW_RS<=GuardNumber or CW_RS=GuardNumber).

Alternatively, if the hop count is 0, GuardNumber may be set greater than a value obtained by subtracting a slot size corresponding to a length of the synchronization beacon frame (slots of the length of a synchronization beacon frame) from the maximum value (i.e., CW_RS) of the interval in which the back-off count value for the synchronization beacon frame transmission is selected (i.e., CW_RS<GuardNumber+slots of the length of a synchronization beacon frame).

Alternatively, if the hop count is equal to 1, GuardNumber may be set smaller than/equal to/greater than a minimum value (i.e., 40) of the interval in which the back-off count value for the synchronization beacon frame is selected (i.e., 40<=GuardNumber or 40=GuardNumber or 40<GuardNumber).

Alternatively, as the length of the discovery window increases, GuardNumber may also increase. Specifically, GuardNumber may be set to one of the following values: a value equal to an integer obtained by considering a slot time with respect to (0.25*length of DW); a value equal to or smaller than the integer obtained by considering the slot time with respect to (0.25*length of DW); and a value smaller than the integer obtained by considering the slot time with respect to (0.25*length of DW).

Alternatively, if the hop count corresponds to a largest value in available values, GuardNumber may be set greater than a maximum value of the interval in which the back-off count value for the synchronization beacon frame transmission is selected (i.e., GuardNumber<=(or <, or =) (HC (hop count) threshold+1)*40)

Alternatively, GuardNumber may be set a value equal to or smaller than the integer obtained by considering the slot time with respect to (0.25*length of DW).

In case of retransmission, CW in the previously set interval [0, CW] may be set to a value smaller than the initial value in each step according to the number of times of retransmission. The value may be fixed to the previously set value or be set a value according to a ratio (where 0<ratio<1) with respect to the initial value. Alternatively, depending on the number of CWs that expect (re)transmission, the following method can be applied.

An interval [Tpkt(p), TEndDW] for determining a value of TRS(p) should be configured in consideration of a minimum interval in which response from another NAN terminal can be expected. In other words, transmission/processing times, a frame length and the like should be considered. Thus, TEndDW may correspond to a value obtained by adding a value generated from converting (TEndDW−frame length (e.g., 200 μs to 400 μs)) into a slot unit to a delay (i.e., processing delay+transmission delay+margin). Alternatively, TEndDW may correspond to 0.75*length of DW (or a value converted in consideration of the slot time).

If a NAN terminal should transmit a response message to another NAN terminal in a single DW interval, the NAN terminal performs scanning until TEndDW, the value obtained by adding the value generated from converting (TEndDW−frame length (e.g., 200 μs to 400 μs)) into the slot unit to the delay (i.e., processing delay+Transmission delay+margin), 0.75*length of DW, or (0<X<1)*length of DW interval without back-off counting from TRS(p). Then, if a medium is in an idle state, the NAN terminal attempts transmission. As another method, after defining an interval for transmitting the response message in advance, the NAN terminal may define and use a new back-off count for response, which will be used at a starting point of the interval.

Meanwhile, a NAN terminal should select a new Random Factor value every 120 discovery windows. In this case, the Random Factor value may be selected every discovery window before the discovery window starts. Alternatively, the Random Factor value may be set at a prescribed time of the discovery window. Alternatively, the NAN terminal may select the Random Factor value before transmitting its synchronization beacon frame. If the Random Factor is changed (i.e., an MR value is changed) after transmission of the synchronization beacon frame, the master rank value may become larger than a stored anchor master rank value. In this case, there may be a plurality of anchor masters in the same NAN cluster.

Regarding anchor master selection mentioned in the foregoing description, AMBTT may be configured as follows. A target beacon transmission time (TBTT) is determined with reference to a synchronization beacon transmission time of a NAN device that initiates a NAN cluster and the TBTT is repeated with a period of 512 TUs (where 1 TU=1024 us). NAN devices included the corresponding NAN cluster may wake up every period and then transmit/receive synchronization beacon frames and service discovery frames with each other during 16 TUs corresponding to a discovery window interval. Moreover, the anchor master selection can be performed during the above period. If the anchor master is changed, AMBTT is also changed. In this case, if a NAN terminal fails in receiving the synchronization beacon and/or the discovery beacon from the anchor master, the NAN terminal is unable to obtain the above information until a next discovery window. Moreover, a starting point of the discovery window is erroneously operated. Therefore, AMBTT needs to be set to a value that is generated based on AMBTT of the NAN device initiating the NAN cluster in consideration of the discovery window repetition period (e.g., AMBTT of the NAN terminal initiating the NAN cluster+(discovery window period (512 TUs)*N (where N is an integer))). In this case, N may be increased by 1. N is used by setting its maximum value. If a combined value is greater than a maximum value of the TSF timer, N is reset (e.g., N=0, 1, or a predefined initial value). Alternatively, when the anchor master is changed, N can be reset. Alternatively, AMBTT of the NAN terminal initiating the NAN cluster and (discovery window period (512 TUs)*N (where N is an integer)) can be configured separately. Alternatively, AMBTT of the NAN terminal initiating the NAN cluster and N (where N is an integer) can be informed. Since a NAN terminal already knows the discovery window period, the NAN terminal may obtain the starting point of the discovery window per period using the above-mentioned AMBTT and N. Alternatively, AMBTT, a discovery window interval that will be used now, and currently used discovery windows may be informed in the form of a bitmap. This enables a NAN device that intends to generate a new NAN cluster to confirm the currently used discovery windows after receiving NAN beacons during a prescribed interval and to select a discovery window that will be used by the corresponding NAN device. Such information is configured in the form of the bitmap and then transmitted together with the beacon frame.

After receiving the discovery beacon or the synchronization beacon from at least one NAN device, the NAN device that intends to generate the new NAN cluster obtains AMBTT information of a cluster attribute of NAN attribute IE in either beacon time stamp or beacon information. Thereafter, the NAN terminal matches synchronization and then confirms an $N^{th}$ discovery window. Finally, the NAN terminal can transmit the beacon without overlapping intervals.

Figure 9:
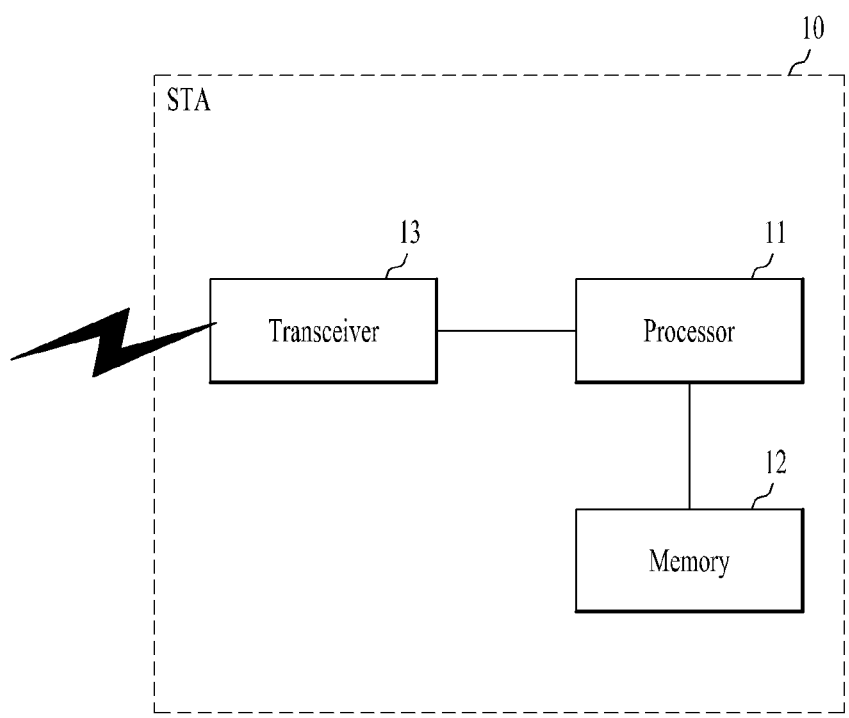
FIG. 9 is a block diagram illustrating a configuration of a wireless device according to one embodiment of the present invention.

FIG. 9 is a block diagram illustrating a configuration of a wireless device according to one embodiment of the present invention.

Referring to FIG. 9, a wireless device 10 may include a processor 11, a memory 12, and a transceiver 13. The transceiver 13 can transmit/receive radio signals and implement a physical layer according to, for example, IEEE 802 system. The processor 11 is connected to the transceiver 13 electrically and can then implement the physical layer and/or a MAC layer according to the IEEE 802 system. Moreover, the processor 11 may be configured to perform at least one operation of the application, the service and the ASP layer according to the various embodiments of the present invention mentioned in the foregoing description. Alternatively, the processor 11 may be configured to perform operations related to a device operating as an AP/STA. Moreover, a module for implementing the operations of the wireless device according to the various embodiments of the present invention mentioned in the foregoing description may be saved in the memory 12 and then driven by the processor 11. The memory 12 may be included inside the processor 11 or be provided outside the processor 11. And, the memory 12 can be connected to the processor 11 through known means.

The detailed configuration of the wireless device 10 in FIG. 9 may be implemented such that each of the various embodiments of the present invention described above is applied independently or at least two thereof are simultaneously applied. And, redundant description shall be omitted for clarity.

The embodiments of the present invention mentioned in the foregoing description can be implemented using various means. For instance, the embodiments of the present invention can be implemented using hardware, firmware, software and/or any combinations thereof.

In case of the implementation by hardware, a method according to the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to the embodiments of the present invention can be implemented by modules, procedures, and/or functions for performing the above-explained functions or operations. Software code is stored in the memory unit and can be driven by the processor. The memory unit is provided within or outside the processor to exchange data with the processor through the various means known to the public As mentioned in the foregoing description, the detailed descriptions for the preferred embodiments of the present invention are provided to enable those skilled in the art to implement and practice the invention. While the present invention has been described herein with reference to the preferred embodiments thereof, it will be apparent to those skilled in the art that various modifications and variations can be made therein without departing from the spirit and scope of the invention. Therefore, the present invention is not limited to the embodiments disclosed herein but intends to give a broadest scope that matches the principles and new features disclosed herein.

INDUSTRIAL APPLICABILITY

Although the various embodiments of the present invention have been described above mainly with reference to an IEEE 802.11 system, the present invention can be applied to various mobile communication systems in the same manner.

What is claimed is:

1. A method of transmitting a signal by a NAN (neighbor awareness networking) terminal in a wireless communication system, the method comprising:
sensing a medium within a discovery window;
selecting a back-off count value when the medium is in an occupied state; and
transmitting a service discovery frame after performing countdown based on the back-off count value,
wherein an interval for selecting the back-off count value is determined based on at least one selected from the group consisting of an interval for selecting a back-off count value for transmission of a synchronization beacon frame, a length of the discovery window, and a value of a hop count of the terminal.

2. The method of claim 1, wherein when the hop count is 0, a minimum value of the interval for selecting the back-off count value is equal to or greater than a maximum value of the interval for selecting the back-off count value for the synchronization beacon frame transmission.

3. The method of claim 1, wherein when the hop count is 0, a minimum value of the interval for selecting the back-off count value is greater than a value obtained by subtracting a slot size corresponding to a length of the synchronization beacon frame from a maximum value of the interval for selecting the back-off count value for the synchronization beacon frame transmission.

4. The method of claim 1, wherein when the hop count is 1, a minimum value of the interval for selecting the back-off count value is equal to or greater than a minimum value of the interval for selecting the back-off count value for the synchronization beacon frame transmission.

5. The method of claim 1, wherein as the length of the discovery window increases, a minimum value of the interval for selecting the back-off count value increases.

6. The method of claim 1, wherein a maximum value of the interval for selecting the back-off count value is set to 500.

7. The method of claim 1, wherein when the hop count corresponds to a largest value in available values, a minimum value of the interval for selecting the back-off count value is greater than a maximum value of the interval for selecting the back-off count value for the synchronization beacon frame transmission.

8. The method of claim 1, wherein the terminal corresponds to a terminal serving as a master in a NAN cluster.

9. The method of claim 1, wherein when the medium is in the occupied state, the countdown is stopped.

10. The method of claim 1, wherein the terminal selects a random factor before the discovery window starts.

11. The method of claim 1, wherein the terminal selects a random factor immediately before transmitting the synchronization beacon frame.

12. The method of claim 10, wherein when a master rank determined based on the selected random factor is greater than a stored anchor master rank, the terminal serves as an anchor master.

13. A NAN (neighbor awareness networking) terminal in a wireless communication system, comprising:
   a receiving module; and
   a processor,
   wherein the processor is configured to sense a medium within a discovery window, to select a back-off count value when the medium is in an occupied state, and to transmit a service discovery frame after performing countdown based on the back-off count value and
   wherein an interval for selecting the back-off count value is determined based on at least one selected from the group consisting of an interval for selecting a back-off count value for transmission of a synchronization beacon frame, a length of the discovery window, and a value of a hop count of the terminal.

* * * * *